United States Patent
Perlmuter et al.

(10) Patent No.: US 9,838,383 B1
(45) Date of Patent: Dec. 5, 2017

(54) MANAGING PRIVILEGED SHARED ACCOUNTS

(71) Applicants: Ron Perlmuter, Tel Aviv (IL); Amir Jerbi, Givatayim (IL); Nir Barak, Karmi Yosef (IL); Miron Gross, Kfar Haoranim (IL)

(72) Inventors: Ron Perlmuter, Tel Aviv (IL); Amir Jerbi, Givatayim (IL); Nir Barak, Karmi Yosef (IL); Miron Gross, Kfar Haoranim (IL)

(73) Assignee: CA, Inc., New York, NY (US)

( * ) Notice: Subject to any disclaimer, the term of this patent is extended or adjusted under 35 U.S.C. 154(b) by 732 days.

(21) Appl. No.: 13/937,809

(22) Filed: Jul. 9, 2013

(51) Int. Cl.
- *G06F 7/04* (2006.01)
- *H04L 29/06* (2006.01)
- *G06F 15/16* (2006.01)

(52) U.S. Cl.
CPC .................. *H04L 63/083* (2013.01)

(58) Field of Classification Search
CPC ........ G06F 21/31; G06F 21/316; G06F 21/45; G06F 21/46; G06F 21/55; G06F 21/554; G06F 21/604; G06F 2221/2111; G06F 11/3664; G06F 11/30; G06F 11/3672; G06F 11/3684; G06F 8/60; G06F 8/61; G06F 8/65; G06F 9/455; G06F 9/45504; G06F 9/546; H04L 63/083; H04L 63/10; H04L 41/5038; H04L 43/00; H04L 67/2861
USPC ................... 726/1, 2, 4, 6; 709/224
See application file for complete search history.

(56) References Cited

U.S. PATENT DOCUMENTS

| | | | | |
|---|---|---|---|---|
| 2007/0261103 A1* | 11/2007 | Viavant | ................... | G06F 21/40 726/2 |
| 2009/0241031 A1* | 9/2009 | Gamaley | ................ | G06Q 10/10 715/736 |
| 2011/0023107 A1* | 1/2011 | Chen | ................... | H04L 63/0281 726/12 |
| 2011/0162047 A1* | 6/2011 | Reeves | ................... | G06F 21/33 726/4 |
| 2011/0247059 A1* | 10/2011 | Anderson | ............... | G06F 21/31 726/6 |
| 2011/0265160 A1* | 10/2011 | Nettleton | ................ | G06F 21/31 726/6 |
| 2011/0277016 A1* | 11/2011 | Hockings | ................ | G06F 21/41 726/4 |
| 2011/0296001 A1* | 12/2011 | Ramstrom | ............ | G06F 21/604 709/224 |

(Continued)

*Primary Examiner* — Gary Gracia
(74) *Attorney, Agent, or Firm* — Baker Botts L.L.P.

(57) ABSTRACT

A method includes receiving a target credential object having administrative rights over a first user account located on a target system. The first user account includes a log-in permission for the target system. The method also includes receiving data indicative of a second user account corresponding to the first user account, wherein the second user account is located on a local system. The method further includes sending a first request to remove the log-in permission from the first user account to the target system using the target credential object. The method still further includes receiving a log-in request corresponding to the second user account on the local system. The method additionally includes, in response to receiving the log-in request for the second user account, sending a second request to add the log-in permission on the first user account to the target system using the target credential object.

20 Claims, 5 Drawing Sheets

(56) References Cited

U.S. PATENT DOCUMENTS

| | | | |
|---|---|---|---|
| 2012/0272301 A1* | 10/2012 | LoBean | H04L 9/3228 726/6 |
| 2013/0086658 A1* | 4/2013 | Kottahachchi | G06F 21/45 726/6 |
| 2013/0145457 A1* | 6/2013 | Papakipos | G06F 21/6245 726/19 |
| 2013/0232541 A1* | 9/2013 | Kapadia | G06F 21/33 726/1 |

* cited by examiner

MANAGING PRIVILEGED SHARED ACCOUNTS

BACKGROUND

The disclosure relates generally to privileged shared accounts, and more specifically to a system and method for managing privileged shared accounts.

SUMMARY

According to one embodiment of the disclosure, a method includes receiving a target credential object having administrative rights over a first user account located on a target system. The first user account includes a log-in permission for the target system. The method also includes receiving data indicative of a second user account corresponding to the first user account, wherein the second user account is located on a local system. The method further includes sending a first request to remove the log-in permission from the first user account to the target system using the target credential object. The method still further includes receiving a log-in request corresponding to the second user account on the local system. The method additionally includes, in response to receiving the log-in request for the second user account, sending a second request to add the log-in permission on the first user account to the target system using the target credential object.

Other objects, features, and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the objects, features, and advantages thereof, reference now is made to the following description taken in connection with the accompanying drawings.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

IT managers use privileged identity management (PIM) software to control use of privileged shared accounts for multiple users. Often, PIM software incorporates use of privileged password management techniques. These techniques include the use of scrambling the privileged account's passwords while securely storing and controlling current account password values. However, privileged password management solutions have limitations. For example, some privileged account passwords cannot be changed. As another example, some systems regulate the frequency with which a privileged account password can be changed. If the password is changed too often within a certain time period, the user may be locked out of the system.

As another example of a potential shortcoming of privileged password management techniques, consider a case where PIM software provides an un-rotated privileged account password to a user. The user may use the privileged account throughout an extended period of time without reporting the usage to the PIM software. This type of use bypasses the PIM software and creates security and audit hazards for the organization.

Figure 1:
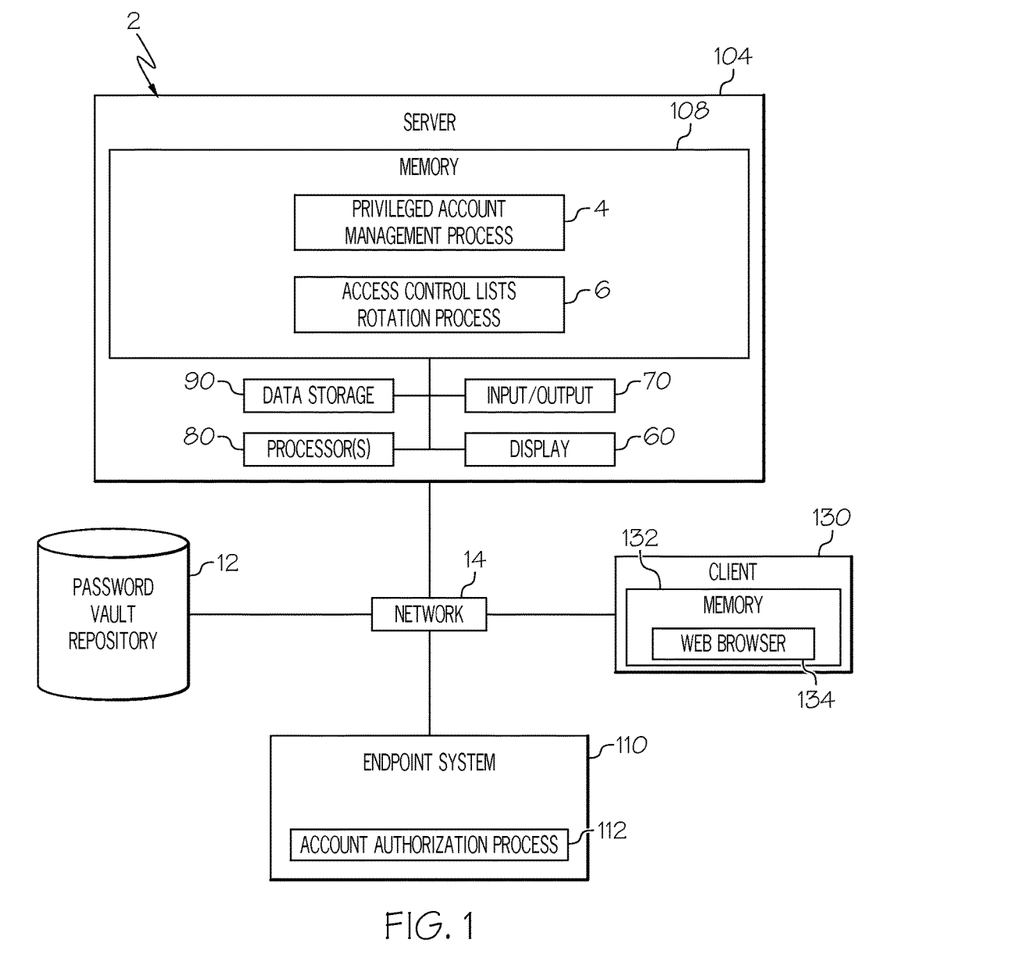
FIG. 1 illustrates a block diagram of a system for managing privileged shared accounts in accordance with a particular non-limiting embodiment of the present disclosure.

With reference to FIG. 1, a system 2 for managing privileged shared accounts is illustrated in accordance with one particular non-limiting embodiment of the present disclosure. In accordance with FIG. 1, a server 104, password vault repository 12, client 130, and endpoint system 110 are disclosed. In the depicted embodiment, server 104 includes a memory 108 and processor(s) 80 running a privileged account management process 4 and an access control lists (ACL) rotation process 6. Server 104 also includes a data storage 90, input/output 70, and display 60. Network 14 connects server 104 to password vault repository 12 that may be hosted on a separate computer/server, or the same server 104. Network 14 also connects server 104 to endpoint system 110 which runs an account authorization process 112 to authenticate and authorize login requests. ACL rotation process 6 maintains a list of privileged user accounts registered with the privileged account management process 4. ACL rotation process 6 contacts endpoint system 110 account authorization process 112 using an administrator or privileged network account and modifies each privileged account permission setting for the privileged accounts that it manages to deny log in access.

Client 130 connects to privileged account management process 4 through network 14 in order to log in to an account on endpoint system 110. A user using client 130 is presented with a login prompt to log in to privileged account management process 4. Once the local account log in is complete, the user is presented with a check-out screen that displays all the managed accounts available for the user. The user selects a privileged account corresponding to endpoint system 110 through privileged account management process 4, and checks out the selected privileged account. When a privileged account is checked out, ACL rotation process 6 contacts endpoint system 110 account authorization process 112 through network 14 and modifies permissions associated with the privileged account. The permissions are modified such that the checked out account enables a user to log in to the account on endpoint system 110.

Privileged account management process 4 displays the user login and password to the user, who can then access endpoint system 110 and log in by entering the checked out user account and password into account authorization process 112. In some embodiments, privileged account management process programmatically logs in to endpoint system 110 account authorization process 112 for the user. In other embodiments, Integrated Windows Authentication (IWA), or other similar technologies, performs authentication operations for the user on a variety of systems. In these embodiments, the log in is performed automatically using, for example, Active Directory, at endpoint system 110.

Once the user has logged in to endpoint system 110, ACL rotation process 6 contacts endpoint system 110 and modifies the permissions associated with the checked out privileged user account such that all other access to the privileged account is denied.

In certain embodiments, client 130 includes memory 132 and a web browser 134. Web browser 134 displays a web page from server 104 that enables the user to log in to privileged account management process 4 via client 130.

In certain embodiments, ACL's include a list of permissions for a computing resource. For example, an ACL specifies which users or system processes are granted access to certain computer systems, as well as what operations are allowed for the systems.

In certain embodiments, endpoint system 110 includes one or more of a physical computing system, a virtual machine, an internet portal, a web server, a virtual private network, a remote desktop client session, a team server, or any other system requiring credentialed login access with privileged user account management. Endpoint system 110 may be physically located externally or internally to server 104. In certain embodiments, endpoint system 110 is loaded in memory 108 of server 104. For example, server 104 hosts virtualization software. In this example, endpoint system 110 represents a virtual machine that uses privileged user accounts to control access permissions. In other embodiments, memory 132 on client 130 runs a client for accessing endpoint system 110 (e.g., a remote desktop client, or a web browser client for web applications).

In certain embodiments, password rotation policies are implemented in system 2 in conjunction with ACL rotation policies. For example, privileged account management process 4 includes logic that generates new passwords for managed user accounts on certain endpoint systems (e.g., endpoint systems not illustrated in FIG. 1). These password rotation policies can be configured with a password policy. The password policy includes rules for managing password rotation schemes including special rules for each endpoint system 110.

In certain embodiments, password vault repository 12 contains password information for a variety of privileged user accounts for a variety of endpoint systems 110. Privileged account management process 4 manages a variety of heterogeneous endpoint system accounts using password vault repository 12. Access to password vault repository 12 is secured such that users should not interact with password vault repository 12. Passwords may further be stored in an encrypted format that only privileged account management process 4 can decrypt for presentation to the user or automated log in processes. In certain embodiments, password vault repository 12 is located in memory 108 of server 104.

Figure 2:
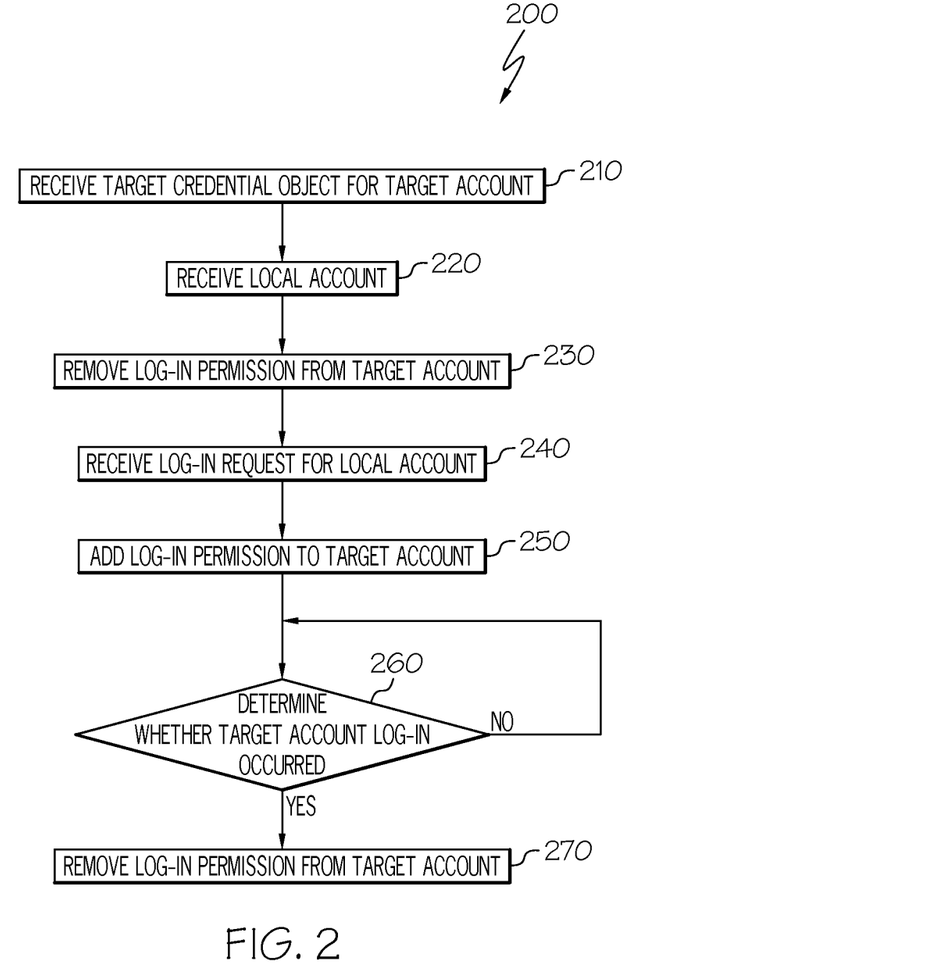
FIG. 2 illustrates a flowchart of a method for managing privileged shared accounts in accordance with another non-limiting embodiment of the present disclosure.

Referring to FIG. 2, a method 200 for managing privileged shared accounts is illustrated in accordance with another non-limiting embodiment of the present disclosure. At step 210, a target credential object for a target privileged user account is received at a PIM server (e.g., server 104). In certain embodiments, an administrator sends the target credential object for a target account to the PIM server via a user interface. In other embodiments, the process is automated such that the PIM server retrieves the privileged user account information from a directory service such as WINDOWS Active Directory® (AD). For example, an automated PIM process (e.g., privileged account management process 4 from FIG. 1) uses the lightweight directory access protocol (LDAP) to access privileged account information. A batch process may be used to gather a list of user accounts.

The target credential object includes an account user name and a password. The target credential object may include some information about the target endpoint where the user name is active such as an internet protocol (IP) address.

In certain embodiments, the target credential object is stored in a secure password vault. For example, the secure password vault may be a secure repository with the password contents encrypted.

At step 220, a local account is received. For example, an administrator uses a user interface for privileged account management process 4 to select and/or enter log in information for a local user account. The local account is then created or referenced by the information entered by the administrator. In some embodiments, the administrator associates the local account with the target account. This association indicates that the user of the local account has been granted privileges to access the target account. In some embodiments, the local account information is also stored in the password vault.

At step 230, log-in permissions are removed from the target account on the target endpoint. In certain embodiments, this action is automatically triggered when the user account is received by the PIM server. In other embodiments, an event triggers execution of privilege modifications in order to increase performance, minimize open connections to the various endpoints and organize the privilege management system operations. For example, a nightly process may be run to update user accounts in the password vault, maintain their associations with local accounts, and/or minimize bandwidth usage and end point connections during busy time periods (e.g., work hours).

At step 240, a user logs in to the PIM server using their local account. The log in request may occur through a web portal, web application from a remote client, or any other available means for logging in to the PIM server. In other embodiments, the user may log in using a monitor with an input device connected to the PIM server. In other embodiments, PIM management processes are accessible via a web service. Other applications can access the PIM management processes using a client API by providing the application developers with the PIM management process endpoints.

Once a user logs into the PIM server, the user is presented with a series of endpoints and/or systems and accounts. The user may then select an account to check-out the account. The check-out process may be automated. For example, when a user logs into the PIM server using the local account, the check-out process may automatically occur for each target account associated with the user's local account.

At step 250, log-in permissions are added to the target endpoint for the target account. PIM server processes access the checked out endpoint or system using an administrator or network system user account and modify the permissions for the target account such that the user can use the user name and password as specified in the target credential object to log in to the target endpoint.

At step 260, the PIM server processes determine whether the user logged into the target account successfully. In certain embodiments, privileged account management process 4 polls the target endpoint to determine whether a log in for the account occurred. In other embodiments, a script sends a message to the PIM server once the log in occurs. In certain embodiments, the log in permissions are only changed to allow access for a predetermined time period. If the user has not logged in within the time period then the account permissions are reverted back to deny access. At step 270, PIM server processes remove the log in permissions added in step 250.

In certain embodiments, the target accounts correspond to user groups. For example, PIM server may manage rotating permission policies for a group of users. Similarly, one target account may correspond to a group of local accounts. In this example, checking out one account prevents other local account holders from accessing the checked out account while in use.

Figure 3:
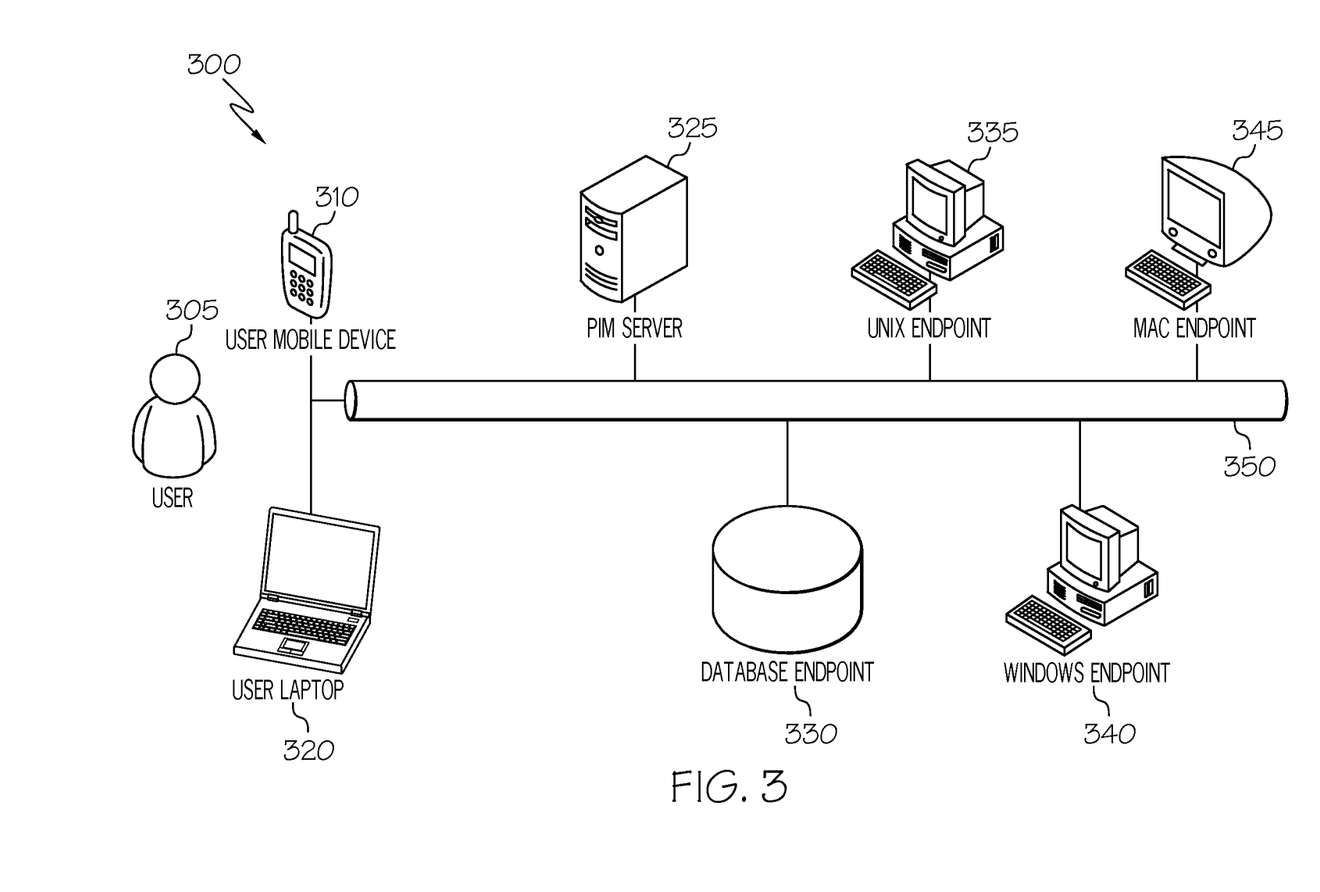
FIG. 3 illustrates a network diagram of a system for managing privileged shared accounts in accordance with yet another non-limiting embodiment of the present disclosure.

Referring to FIG. 3, a network diagram 300 of a system for managing privileged shared accounts is illustrated in accordance with one embodiment of the present disclosure. Network 350 connects user 305 to a variety of devices, endpoints, systems, and databases. In certain embodiments, user 305 uses a laptop 320 to log in to PIM server 325. PIM server 325 has a user interface that allows the user to remotely log in using a local PIM accounts. As another example, the user uses mobile device 310 to log in to PIM server 325. After logging in to PIM server 325, PIM server 325 processes enable account access for the user accounts on each of database endpoint 330, UNIX endpoint 335, Windows endpoint 340, and mac endpoint 345.

Figure 4:
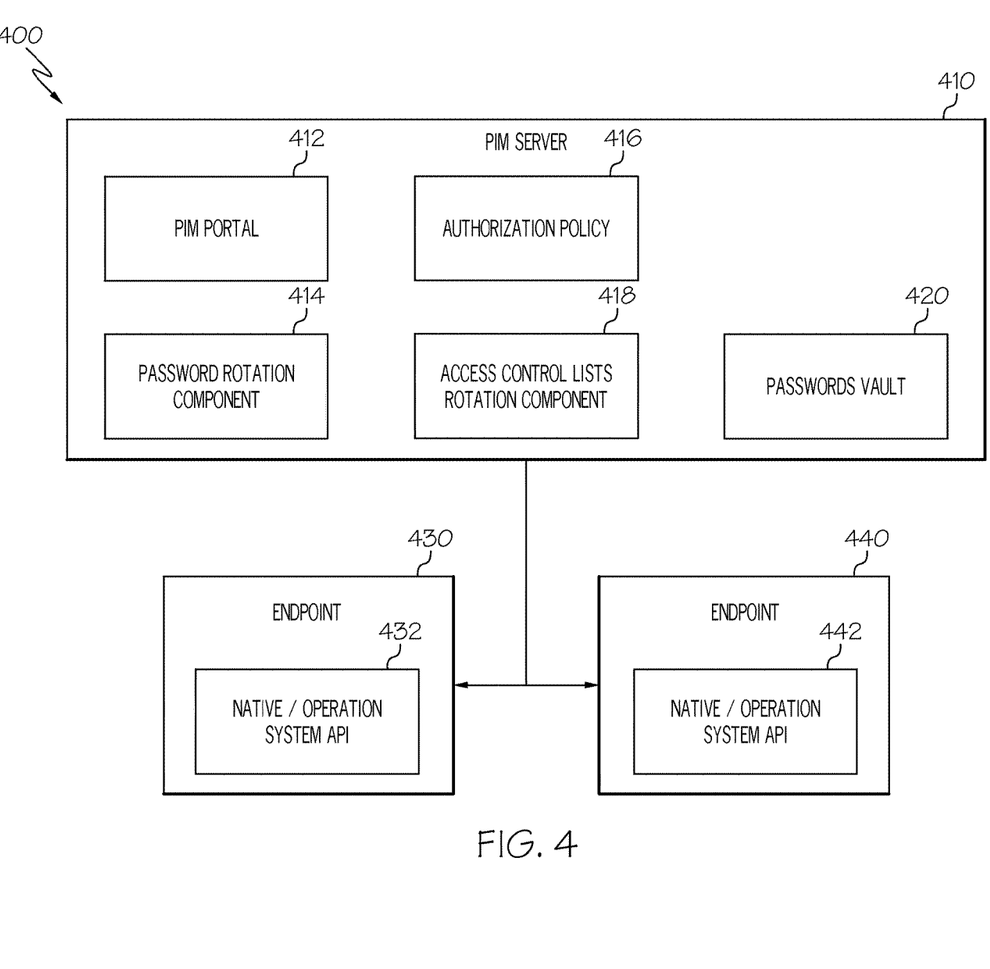
FIG. 4 illustrates a component diagram of a system for managing privileged shared accounts in accordance with still another non-limiting embodiment of the present disclosure.

Referring to FIG. 4, a component diagram 400 of a system for managing privileged shared accounts is illustrated in accordance with one embodiment of the present disclosure. Component diagram 400 features a PIM server 410. In certain embodiments, PIM server 410 resides on a computer, server, web server, cloud computing device, virtual machine, or any equivalent computing platform. PIM server 410 includes a PIM portal 412, authorization policy 416, password rotation component 414 Access Control Lists (ACL) rotation component 418, and a passwords vault 420.

Component diagram 400 also includes endpoints 430 and 440. Endpoint 430 includes a native access control list/operation system API 432 that allows developers to programmatically access and control privileged system accounts. For example, ACL rotation component 418 of PIM server 410 contains a process configured to communicate with native access control list/operation system API 432 in order to configure permissions of privileged accounts located on endpoint 430. ACL rotation component 418 also communicates with native operation system API 432 to determine whether the user has logged in at the endpoint. In certain embodiments, native access control list/operation system API 432 is programmed in a login script at endpoint 430. Such a login script notifies ACL rotation component 418 when a privileged account logs in at endpoint 430 via native access control list/operation system API 432.

Figure 5A:
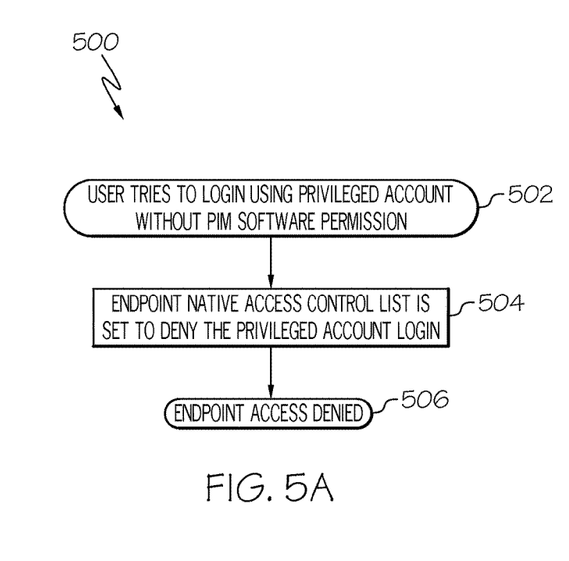
FIG. 5A illustrates a flow diagram of the log in process for a user without authorization from an embodiment of a privileged identity management system described in the present disclosure.

Referring to FIG. 5A a flowchart 500 describing the log in process for a target endpoint without first logging into a PIM server is illustrated in accordance with another non-limiting embodiment of the present disclosure. Flowchart 500 is illustrated from a user perspective. At step 502, the user tries to log in to a target endpoint using a privileged account without first checking out the account from the PIM server. At step 504, the endpoint native access control list is set to deny the privileged account login. At step 506, the user's log in request at the endpoint is denied.

Figure 5B:
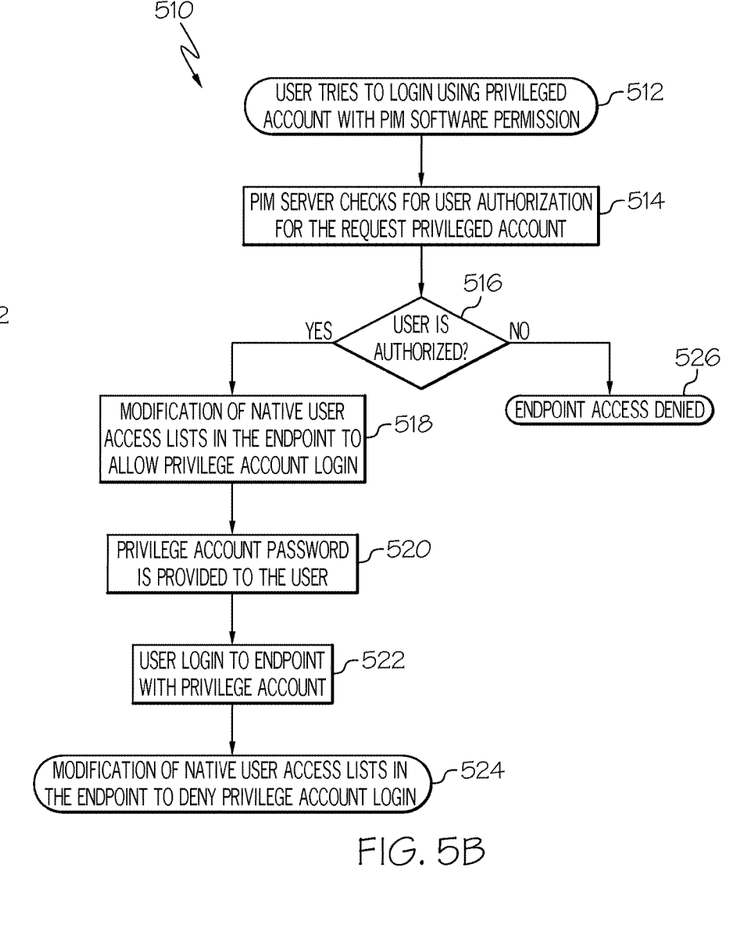
FIG. 5B illustrates a flow diagram of the log in process for a user with authorization from an embodiment of a privileged identity management system described in the present disclosure.

Referring to FIG. 5B a flowchart 510 provides another description from the user perspective of the process that occurs when the user attempts to login to a privileged account at an endpoint after first logging in to the PIM server. At step 512, the user tries to log in at the PIM server using a privileged account. At step 514, the PIM server checks for user authorization for the requested privileged account. At step 516, the PIM server determines whether the user is authorized to use the privileged account. If the PIM server determines the user is authorized, the flowchart continues to step 518, where modification of native user access lists in the endpoint to allow the privileged account to log in occurs. If the user is not authorized by the PIM server at step 516, the endpoint access is denied and no access policies at the endpoint are changed.

Continuing at step 520, a privileged account password is provided to the user. At step 522, the user logs into the endpoint with the privileged account using the privileged account password from step 520. At step 524, user access lists in the endpoint are modified to deny privileged account login.

In certain embodiments, privileged shared account control is enabled through rotating access policies, thus enhancing the PIM software by controlling use of privileged accounts through rotating access policies in an agent-less manner without needing to change the privileged account password. In such embodiments, even if a user holds the privileged account password, she will still fail to log in because the login policies for the privileged account are set to deny access. Login policies are controlled through the PIM software, which will manage the privileged account access through password rotations and dynamic changes to the login permissions of the privileged account.

In certain embodiments, the user is only able to log in using the privileged account by first logging in to the PIM software.

One example embodiment of a process for controlling access to privileged accounts through rotating access policies includes an administration and user role. First, the administrator defines a privileged account on a PIM server. The PIM server connects to a target endpoint, where an account is defined, and modifies the login permissions of the account to be explicitly denied. The PIM server next optionally modifies the account password and stores the new password in its password vault. Next, the administrator defines authorization rules (i.e. who has access to the privileged account) on the PIM server.

In furtherance of the above example, a user authenticates to the PIM server and views a list of privileged accounts that he or she is entitled to. The user next selects a privileged account (e.g., through a check-out operation). Next, the PIM server connects to the remote endpoint, where the selected privileged account is defined, and modifies the login permissions of the privileged account to explicitly allow login. Optionally, the PIM server provides the user with the privileged account password so that the user can log in. The user next logs in to the remote endpoint using the privileged account. The PIM server then connects to the remote endpoint and modifies the login permissions of the privileged account to explicitly deny login.

In certain embodiments, an existing PIM server is enhanced with alternative management options and control of privileged accounts resident in the endpoints. By leaving the privileged account passwords unchanged, the privileged account management techniques described in some embodiments of the present disclosure allow increasing the customer base of PIM software that were unable to use previous account management techniques. For example, some customers were unable to utilize PIM software due to technology issues or organizational policies the restrict rotating privileged account passwords.

In certain embodiments, the PIM software changes the default configuration for privileged accounts in certain endpoints such that they deny any login attempts for the privileged accounts by default. Then, only once a user requests or gains access to the privileged account using the PIM software, can she use the privileged account.

In certain embodiments, the teachings of the present disclosure are distributed within a single PIM server, and communicate via a network with any number of endpoint systems.

In one example, a PIM server includes a centralized server which controls access to privileged accounts through password rotations and modifications of login permissions. The PIM server includes a password vault that stores the current passwords for privileged accounts. The PIM server also includes a password rotation component that modifies privileged account passwords on target endpoints according to predetermined password policies. The PIM server additionally includes an access control lists (ACL) rotation component that modifies privileged account login policies on target endpoints based on user permissions. The PIM server further includes a PIM portal that displays to users which privileged accounts they have access to. The PIM server also includes an authorization policy that controls user access to privileged accounts.

In accordance with the above example, several endpoints are connected to the PIM server via a network. The endpoints are target endpoints where privileged accounts are defined. The endpoints include a native operating system application programming interface (API) that enables changing privileged account passwords and login ACL's.

In certain embodiments, the features described in accordance with the disclosure enable PIM software to control privileged account access without rotating passwords. Controlling privileged account access without rotating passwords is important in cases where password rotation is not possible due to company policy or technology limitations.

In certain embodiments, the features described in accordance with the disclosure enable disabling privileged account password access by default. In such embodiments, users need to get approval from the PIM software to use the privileged account. Requiring approval from the PIM software enables better auditing control, user accountability, compliance monitoring, and security for privileged account control systems.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
receiving, by a server comprising one or more processors coupled to a memory, a target credential object having administrative rights over a target user account located on a target system, wherein the target user account comprises a log-in permission for the target system;
creating, by the server, a local user account that is associated with the target user account based on log-in information provided by a user;
receiving, by the server, data indicative of the local user account, wherein the local user account is located on a local system;
in response to receiving the data indicative of the local user account, removing, by the server the log-in permission from the target user account on the target system using the target credential object, wherein removing the log-in permission prevents any user of the target user account from logging into the target system while the target user account is associated with the target system;
in response to determining that the user logged in to the local system using the local user account, formatting for display a plurality of accounts for the user to check-out; and
in response to receiving a selection, from the user, of one of the plurality of accounts corresponding to the target user account, adding, by the server, the log-in permission on the target user account on the target system using the target credential object, wherein adding the log-in permission allows any user of the target user account to log into the target system after authentication.

2. The method of claim 1, further comprising:
determining that a log-in event corresponding to the target user account occurred; and in response to determining that the log-in event occurred, removing the log-in permission from the target user account on the target system using the target credential object.

3. The method of claim 2, wherein determining that the log-in to the target user account occurred comprises receiving a message from the target system.

4. The method of claim 2, wherein determining that the log-in to the target user account occurred comprises polling the target system.

5. The method of claim 1, further comprising:
receiving a password policy comprising password modification rules corresponding to the target system;
modifying a target user account password on the target system based on the modification rules, wherein the target user account further comprises the target user account password.

6. The method of claim 5, further comprising:
in response to modifying the target user account password, updating a target credential password based on the modification rules, wherein the target credential object comprises the target credential password.

7. The method of claim 1, further comprising:
further in response to determining that the user logged in to the local system using the local user account, formatting for display a target user account password, wherein the target user account further comprises the target user account password.

8. A computer configured to access a storage device, the computer comprising:
a processor; and
a non-transitory, computer-readable storage medium storing computer-readable instructions that when executed by the processor cause the computer to perform:
receiving a target credential object having administrative rights over a target user account located on a target system, wherein the target user account comprises a log-in permission for the target system;
creating a local user account that is associated with the target user account based on credential information provided by a user;
receiving data indicative of the local user account corresponding to the target user account, wherein the local user account is located on a local system;
in response to receiving the data indicative of the local user account, removing the log-in permission from the target user account on the target system using the target credential object, wherein removing the log-in permission prevents any user of the target user account from logging into the target system while the target user account is associated with the target system;
in response to determining that the user logged in to the local system using the local user account, formatting for display a plurality of accounts for the user to check-out; and
in response to receiving a selection, from the user, of one of the plurality of accounts corresponding to the target user account, adding the log-in permission on the target user account on the target system using the target credential object, wherein adding the log-in permission allows any user of the target user account to log into the target system after authentication.

9. The computer of claim 8, wherein the computer-readable instructions further cause the computer to perform:
determining that a log-in event corresponding to the target user account occurred; and
in response to determining that the log-in event occurred, removing the log-in permission from the target user account on the target system using the target credential object.

10. The computer of claim 9, wherein determining that the log-in to the target user account occurred comprises receiving a message from the target system.

11. The computer of claim 9, wherein determining that the log-in to the target user account occurred comprises polling the target system.

12. The computer of claim 8, wherein the computer-readable instructions further cause the computer to perform:
receiving a password policy comprising password modification rules corresponding to the target system;
modifying a target user account password on the target system based on the modification rules, wherein the target user account further comprises the target user account password.

13. The computer of claim 12, wherein the computer-readable instructions further cause the computer to perform:
in response to modifying the target user account password, updating a target credential password based on the modification rules, wherein the target credential object comprises the target credential password.

14. The computer of claim 8, wherein the computer-readable instructions further cause the computer to perform:
in response to determining that the user logged in to the local system using the local user account, formatting for display a target user account password, wherein the target user account further comprises the target user account password.

15. A computer program product comprising:
a non-transitory computer-readable storage medium having computer-readable program code embodied therewith, the computer-readable program code configured to:
receive a target credential object having administrative rights over a target user account located on a target system, wherein the target user account comprises a log-in permission for the target system;
create a local user account that is associated with the target user account based on log-in information provided by a user;
receive data indicative of the local user account, wherein the local user account is located on a local system;
in response to receiving the data indicative of the local user account, remove the log-in permission from the target user account on the target system using the target credential object, wherein removing the log-in permission prevents any user of the target user account from logging into the target system while the target user account is associated with the target system;
in response to determining that the user logged in to the local system using the local user account, formatting for display a plurality of accounts for the user to check-out; and
in response to receiving a selection, from the user, of one of the plurality of accounts corresponding to the target user account, add the log-in permission on the target user account on the target system using the target credential object, wherein adding the log-in permission allows any user of the target user account to log into the target system after authentication.

16. The computer program product of claim 15, wherein the computer-readable program code further configured to:
determine that a log-in event corresponding to the target user account occurred; and
in response to determining that the log-in event occurred, remove the log-in permission from the target user account on the target system using the target credential object.

17. The computer program product of claim 16, wherein determining that the log-in to the target user account occurred comprises receiving a message from the target system.

18. The computer program product of claim 15, wherein the computer-readable program code further comprises:
computer-readable program code configured to receive a password policy comprising password modification rules corresponding to the target system;
computer-readable program code configured to modify a target user account password on the target system based on the modification rules, wherein the target user account further comprises the target user account password.

19. The computer program product of claim 18, wherein the computer-readable program code further configured to:
in response to modifying the target user account password, update a target credential password based on the modification rules, wherein the target credential object comprises the target credential password.

20. The computer program product of claim 15, wherein the computer-readable program code further configured to:
in response to determining that the user logged in to the local system using the local user account, format for display a target user account password, wherein the target user account further comprises the target user account password.

* * * * *